US012692178B2

(12) United States Patent
Pashaian et al.

(10) Patent No.: US 12,692,178 B2
(45) Date of Patent: Jul. 28, 2026

(54) MOBILE CLARIFIER SYSTEM

(71) Applicant: Monroe Environmental Corporation, Monroe, MI (US)

(72) Inventors: Gary Pashaian, Monroe, MI (US); Adam J. Pace, Ypsilanti, MI (US); Adam N. Pashaian, Erie, MI (US); Donald A. Setzler, Monroe, MI (US); Alex Zychowicz, Toledo, OH (US)

(73) Assignee: Monroe Environmental Corporation, Monroe, MI (US)

( * ) Notice: Subject to any disclaimer, the term of this patent is extended or adjusted under 35 U.S.C. 154(b) by 830 days.

(21) Appl. No.: 17/942,403

(22) Filed: Sep. 12, 2022

(65) Prior Publication Data

US 2023/0312373 A1     Oct. 5, 2023

Related U.S. Application Data

(60) Provisional application No. 63/372,174, filed on Apr. 4, 2022.

(51) Int. Cl.
C02F 1/24       (2023.01)
C02F 1/00       (2023.01)

(52) U.S. Cl.
CPC ................ C02F 1/24 (2013.01); C02F 1/004 (2013.01); C02F 2201/006 (2013.01); C02F 2201/008 (2013.01); C02F 2301/022 (2013.01)

(58) Field of Classification Search
None
See application file for complete search history.

(56) References Cited

U.S. PATENT DOCUMENTS

| | | | |
|---|---|---|---|
| 4,056,477 A | 11/1977 | Ravitts | |
| 2020/0031702 A1* | 1/2020 | Ros | B01D 21/2433 |
| 2021/0300784 A1* | 9/2021 | Sheets | B01D 39/083 |

FOREIGN PATENT DOCUMENTS

KR          101051049 B1 *   5/2011   ............... C02F 1/00

OTHER PUBLICATIONS

MT KR101051049 (Year: 2011).*

* cited by examiner

*Primary Examiner* — Peter Keyworth
(74) *Attorney, Agent, or Firm* — Jacob M. Ward; Ward Law Office LLC

(57)          ABSTRACT

A mobile clarifier system is provided. The mobile clarifier system including a trailer assembly and an inlet port. A plurality of separator cartridge assemblies is supported the trailer assembly and is configured to receive the flow of water and/or processing fluids from the inlet port. Each of the plurality of separator cartridge assemblies is configured to separate the settleable solids and the floatable solids from the flow of water and/or processing fluids and is configured to form flow zones, transition zones and calm zones. A discharge pipe system receives the settleable solids from the calm zones and conveys the settleable solids from the mobile clarifier system to downstream operations and an outlet port configured to receive processed water and/or processing fluids flowing from the plurality of separator cartridge assemblies and further configured to convey the processed water and/or processing fluids to downstream operations.

20 Claims, 10 Drawing Sheets

14f

14e

14d

14c

14b

14a

MOBILE CLARIFIER SYSTEM

This application claims the benefit of U.S. Provisional Application No. 63/372,174 filed on Apr. 4, 2022. The entire disclosure of the above application is incorporated herein by reference.

FIELD

The present disclosure relates generally to water treatment systems, and more particularly, to water treatment systems configured for transport to permanent work sites, such as for example manufacturing facilities, temporary work sites and/or water-related bypass operations.

INTRODUCTION

This section provides background information related to the present disclosure which is not necessarily prior art.

Certain municipal and industrial processes and operations can result in water and/or processing fluids that contain settleable solids as well as floating solids/oils. Non-limiting examples of these municipal and industrial processes and operations include fracking operations, environmental remediation, bypass treatments, dredging, mining, surge flows, petroleum refining, food processing, chemical manufacturing, emergency outages and the like. In these instances, it is desirable to remove the settleable solids as well as the floating solids/oils from the water or processing fluids.

Since the locations of the municipal and industrial processes and operations can be remote from other municipal and industrial clarifiers, and it is typically not economically viable to build municipal and industrial clarifiers at the locations of the municipal and industrial processes and operations, it would be advantageous if the removal of the settleable solids as well as the floating solids/oils from the water or processing fluids could be accomplished at the site of the municipal and industrial process and/or operation.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the mobile clarifier assembly.

The above objects as well as other objects not specifically enumerated are achieved by a mobile clarifier system configured to separate settleable solids and floatable solids from a flow of water and/or processing fluids. The mobile clarifier system includes a trailer assembly and an inlet port configured to convey the flow of water and/or processing fluids to the trailer assembly. A plurality of separator cartridge assemblies is supported by the trailer assembly and is configured to receive the flow of water and/or processing fluids from the inlet port. Each of the plurality of separator cartridge assemblies is configured to separate the settleable solids and the floatable solids from a flow of water and/or processing fluids. Each of the plurality of separator cartridge assemblies is configured to form flow zones, transition zones and calm zones. A discharge pipe system is configured to receive settleable solids from the calm zones and is further configured to convey the settleable solids from the mobile clarifier system to downstream operations and an outlet port configured to receive processed water and/or processing fluids flowing from the plurality of separator cartridge assemblies and further configured to convey the processed water and/or processing fluids to downstream operations.

The above objects as well as other objects not specifically enumerated are also achieved by a mobile clarifier system configured to separate settleable solids and floatable solids from a flow of water and/or processing fluids. The mobile clarifier system includes a trailer assembly and an inlet port configured to convey the flow of water and/or processing fluids to the trailer assembly. A plurality of separator cartridge assemblies is supported by the trailer assembly and is configured to receive the flow of water and/or processing fluids from the inlet port. Each of the plurality of separator cartridge assemblies is configured to separate the settleable solids and the floatable solids from the flow of water and/or processing fluids. Each of the plurality of separator cartridge assemblies has a plurality of vanes configured to extend into side frames and intermediate frames a distance sufficient to form transition zones for the water and/or processing fluids flowing through the each of the separator cartridges. A discharge pipe system is configured to receive settleable solids from calm zones and is further configured to convey the settleable solids from the mobile clarifier system to downstream operations and an outlet port is configured to receive processed water and/or processing fluids flowing from the plurality of separator cartridge assemblies and is further configured to convey the processed water and/or processing fluids to downstream operations.

The above objects as well as other objects not specifically enumerated are also achieved by a mobile clarifier system configured to separate settleable solids and floatable solids from a flow of water and/or processing fluids. The mobile clarifier system includes a trailer assembly and an inlet port configured to convey the flow of water and/or processing fluids to the trailer assembly. The inlet port having an outlet end configured to discharge the flow of water and/or processing fluids into the trailer assembly. A plurality of separator cartridge assemblies is supported by the trailer assembly and is configured to receive the flow of water and/or processing fluids from the inlet port. Each of the plurality of separator cartridge assemblies is configured to separate the settleable solids and the floatable solids from the flow of water and/or processing fluids. A discharge pipe system is configured to receive settleable solids from calm zones and is further configured to convey the settleable solids from the mobile clarifier system to downstream operations. An outlet port is configured to receive processed water and/or processing fluids flowing from the plurality of separator cartridge assemblies and is further configured to convey the processed water and/or processing fluids to downstream operations. The flow of water and/or processing fluids into the trailer assembly forms an accumulation having an upper level, and wherein the outlet end of the inlet port is positioned vertically above the upper level of the accumulation.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
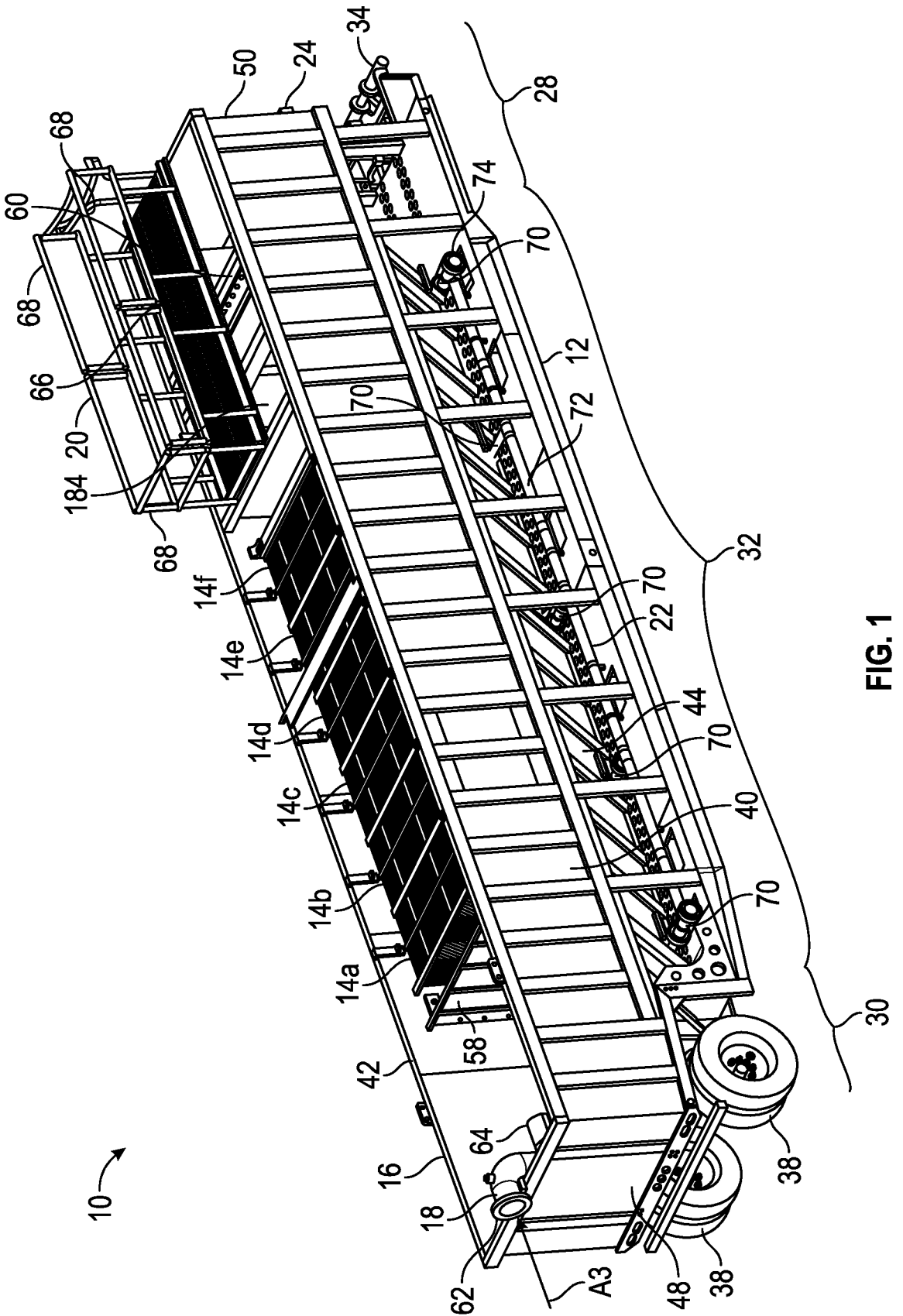
FIG. 1 is a right-side perspective view of a novel mobile clarifier system in accordance with the invention.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed, unless expressly stated otherwise. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

In accordance with the illustrated embodiments of the present disclosure, a mobile clarifier system is provided. Generally, the mobile clarifier system is configured to remove settleable solids as well as floating solids/oils from water and/or processing fluids at the site of a municipal and/or industrial process and/or operation. As used herein, the terms settleable and floatable solids refer to substances which will sink and rise, respectively, within a carrier liquid if that liquid is held still or is maintained in a laminar stream. The mobile clarifier forms flow zones, transition zones and calm zones. The transition zones are formed with vanes extending a distance into side frames and intermediate frames.

Figure 2:
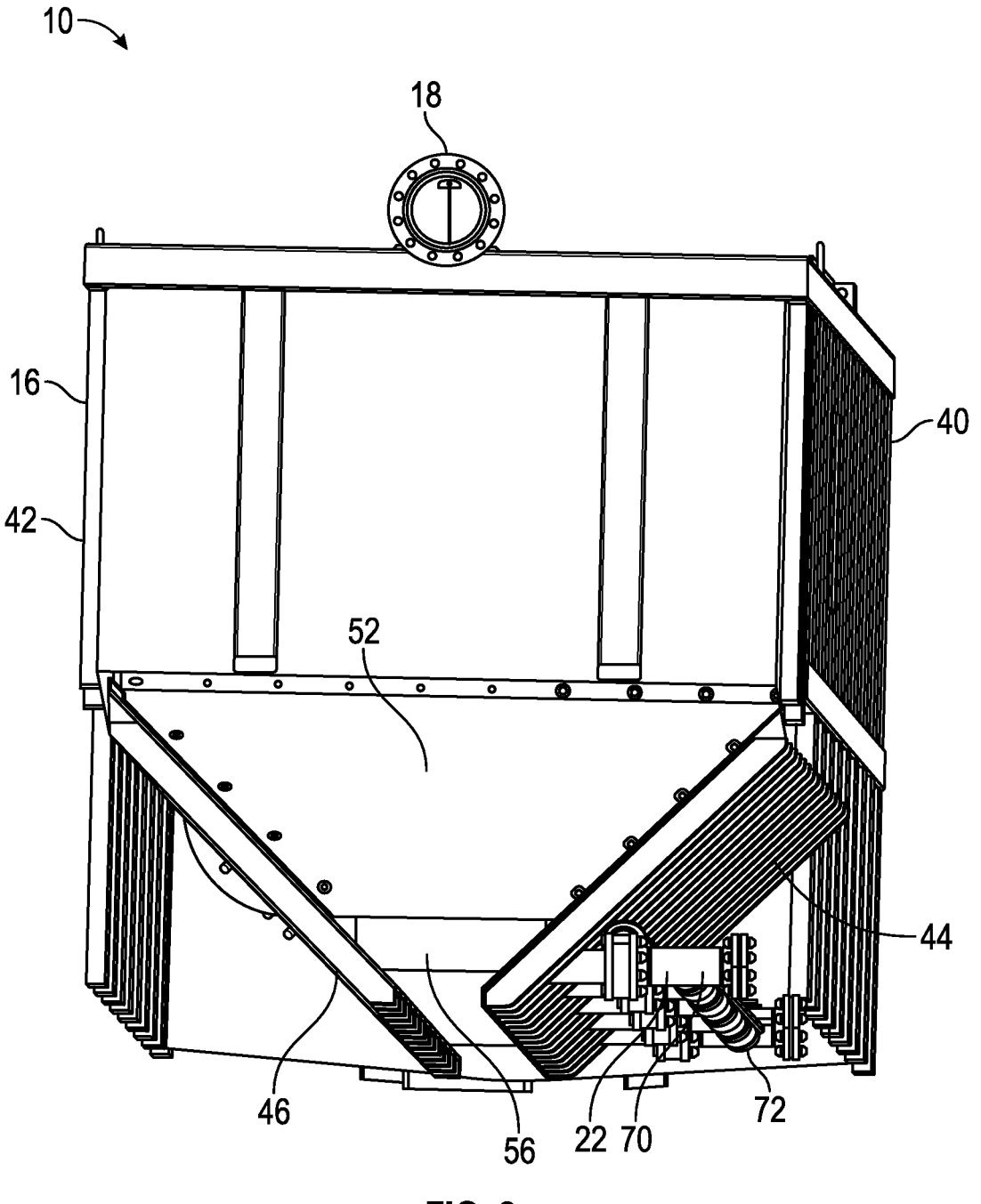
FIG. 2 is a right-side perspective view of a portion of a tank assembly of the novel mobile clarifier system of FIG. 1.
Figure 3:
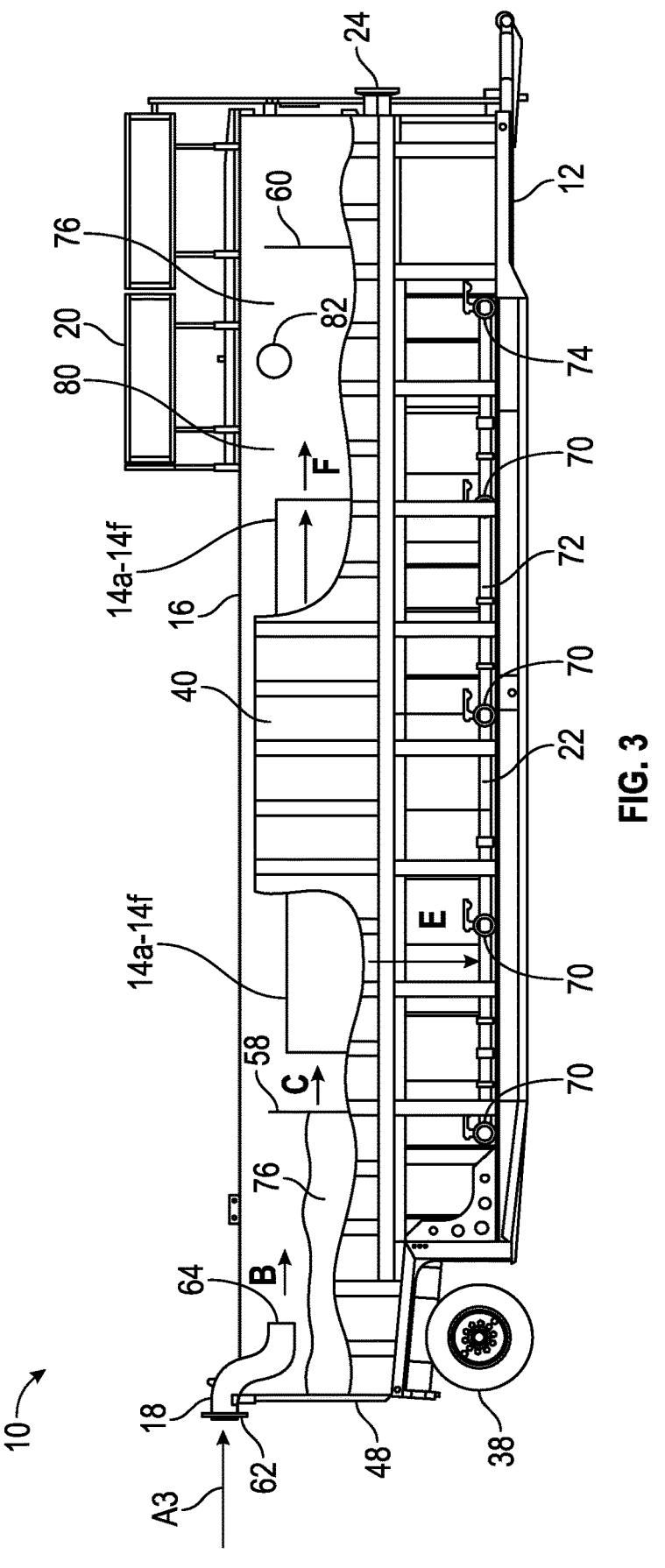
FIG. 3 is a right side view, partially in cutaway, of the novel mobile clarifier system of FIG. 1.

Referring now to the drawings, a first embodiment of a novel mobile clarifier system is illustrated generally in FIGS. 1-3 at 10. The novel mobile clarifier system (hereafter "clarifier system") is configured to remove of settleable solids as well as remove the floating solids/oils from water or processing fluids at the site of a municipal or industrial process and/or operation. The clarifier system 10 includes a trailer assembly 12, a plurality of separator cartridge assemblies 14a-14f (FIGS. 1 and 3), a tank assembly 16, an inlet port 18, an optional platform assembly 20, a discharge pipe system 22 and an outlet port 24.

Referring now to FIGS. 1 and 3, the trailer assembly 12 is configured to support the clarifier system 10 during transport from one location to another location and includes a tongue segment 28, a spaced apart wheel segment 30 and a bed segment 32 extending therebetween. The tongue segment 28 includes a coupler 34 configured for engagement by a winch truck (not shown for purposes of clarity). A kingpin (not shown) extends below the tongue segment 28 and is configured for engagement by a fifth wheel of the winch truck as is known in the trucking arts. While the trailer assembly 12 shown in FIG. 1 and described above includes the use of the kingpin and a fifth wheel for engagement by a winch truck, it should be appreciated that in other embodiments, other suitable trailer and truck connection mechanisms can be used sufficient for the functions described herein.

Referring again to FIGS. 1 and 3, the wheel segment 30 includes spaced apart wheel assemblies 38 supported for rotation by an axle (not shown) extending therebetween. In operation, and with the tongue segment 28 connected to the winch truck, each wheel assembly 38 facilitates rolling transport of the clarifier system 10 from one location to another. While the embodiment shown in FIG. 1 illustrates the use of a quantity of two wheel assemblies 38 and a lone axle, in alternate embodiments, any desirable quantity of wheel assemblies and any quantity of axles can be used sufficient to facilitate rolling transport of the clarifier system 10 from one location to another.

Referring now to FIG. 1, the bed segment 32 extends from the tongue segment 28 to the wheel segment 30 and is configured to support the plurality of separator cartridge assemblies 14a-14f, the tank assembly 16, the inlet port 18, the platform assembly 20, the discharge pipe system 22 and the outlet port 24. In the illustrated embodiment, the bed segment 32 has the form of a framework of structural components as is known in the towing arts. However, in other embodiments, the bed segment 32 can have other forms sufficient to support the plurality of components and assemblies described above.

While the trailer assembly 12 has been described above and shown in FIGS. 1 and 2 in a certain embodiment, it should be appreciated that in other embodiments, the trailer assembly 12 can have different structures, mechanisms and devices sufficient for supporting the clarifier system 10 during transport.

Referring now to FIGS. 1-3, the plurality of separator cartridge assemblies 14a-14f are illustrated in an installed position within the tank assembly 16. The tank assembly 16 includes a first side wall 40, an opposing second side wall 42, a first angled side wall 44, an opposing second angled side wall 46, a first end wall 48, an opposing second end wall 50, a first angled end wall 52, an opposing second angled end wall (not shown for purposes of clarity), a tank bottom 56, a diffusion wall 58 and a tank partition 60.

Referring now to FIG. 1, the first and second side walls 40, 42 and the first and second end walls 48, 50 have a substantially vertical orientation and connected together to form a generally rectangular shape. The first and second angled side walls 44, 46 extend from the first and second side walls 40, 42 to the tank bottom 56. In a similar manner, the first and second angled end walls extend from the first and second end wall 48, 50 to the tank bottom 56.

While the embodiment of the tank assembly 16 shown in FIGS. 1-3 is described above as having substantially vertical side and end walls 40, 42, 48, 50 and angled side and end walls 44, 46, 52, it should be appreciated that in other embodiments, the various side and walls can have other orientations sufficient for the functions described herein.

Figure 4:
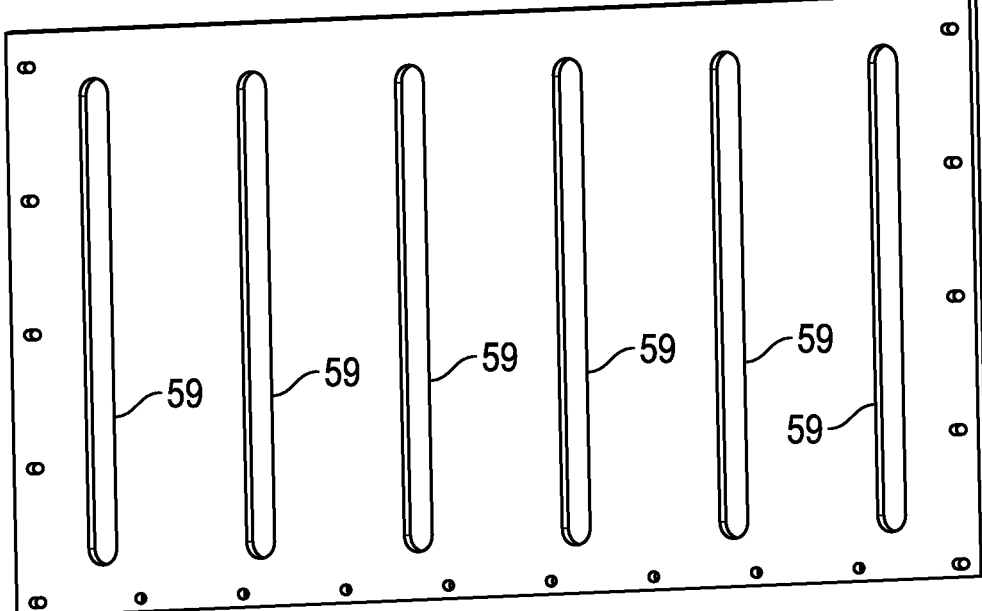
FIG. 4 is a front view of a diffusion wall of the novel mobile clarifier system of FIG. 1.

Referring now to FIGS. 1, 3 and 4, the diffusion wall 58 is located in an upstream position from the plurality of separator cartridge assemblies 14a-14f and extends in a horizontal direction from the first side wall 40 to the opposing second side wall 42 and in a vertical direction from an upper surface of the plurality of separator cartridge assemblies 14a-14f to the first and second angled side walls 44, 46 and the tank bottom 56.

Referring now to FIG. 4, the diffusion wall 58 includes a plurality of apertures 59 configured for several functions. First, the plurality of apertures 59 are configured to meter the amount of water and/or processing fluids entering the plurality of separator cartridge assemblies 14a-14f. Second, the plurality of apertures 59 are configured to quiet or temper the flow of water and/or processing fluids entering the plurality of separator cartridge assemblies 14a-14f in a manner such that the unprocessed flow has the characteristics of a laminar flow. The term laminar flow, as used herein, is defined to mean each point in the fluid has a constant velocity and a constant pressure, thereby facilitating a smooth and/or regular flow path. Laminar flow is in contrast to turbulent flow, in which the flowing fluid undergoes irregular fluctuations and mixing.

Referring again to the embodiment of the diffusion wall 58 shown in FIG. 4, each of the plurality of apertures 59 have the form of an identical, extended slot and all of the apertures 59 are arranged in a parallel orientation. In other embodiments, each of the plurality of apertures 59 can have different forms and can be arranged in non-parallel orientations, sufficient to meter the amount of water and/or processing fluids and form laminar flows entering the plurality of separator cartridge assemblies 14a-14f.

Referring now to FIGS. 1 and 3, the tank partition 60 is located downstream from the plurality of separator cartridge assemblies 14a-14f and extends in a vertical direction from an upper surface of the plurality of separator cartridge assemblies 14a-14f to the first and second angled side walls 44, 46 to the tank bottom 46 and in a horizontal direction from the first side wall 40 to the opposing second side wall 42.

Figure 5:
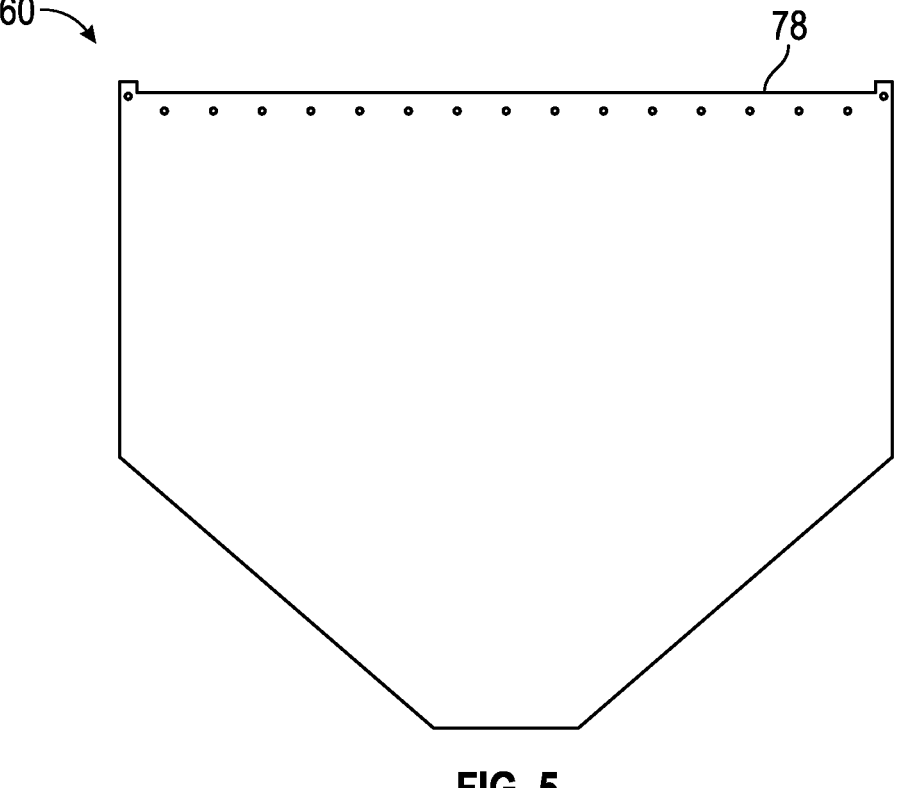
FIG. 5 is a front view of a tank partition of the novel mobile clarifier system of FIG. 1.

Referring now to FIG. 5, the tank partition 60 includes at least one cutout 78 and is configured for several functions. First, the tank partition 60, is configured to substantially stop the flow of water and/or processing fluids exiting the plurality of separator cartridge assemblies 14a-14f, thereby forming a pool of water and/or processing fluids 80. Second, the pool of water and/or processing fluids 80 formed by the tank partition 60 is configured to facilitate skimming operations using a fluid skimmer 82. Finally, the cutout 78 of the tank partition 60 is configured to facilitate flow of the water and/or processing fluids over the top of the tank partition 60 to the outlet port 24.

Referring again to the embodiment of the tank partition 60 shown in FIG. 5, a lone cutout 78 having a generally rectangular cross-sectional shape is illustrated. However, in other embodiments, the tank partition 60 can have any desired quantity of cutouts and the cutouts can have any desired size and shape sufficient for the functions described herein.

Referring now to FIGS. 1-3, the inlet port 18 is configured to convey water and/or processing fluids from an up-stream source (not shown) to a location within the tank assembly 16. The inlet port 18 includes an inlet end 62 and an outlet end 64 and has the form of a multi-curved pipe. In alternate embodiments, the inlet port 18 can have other forms sufficient to convey water and/or processing fluids from an up-stream source to a location within the tank assembly 16.

Referring now to FIGS. 1 and 3, the optional platform assembly 20 is configured to facilitate visual observation of the operation of the clarifier system 10 within the tank assembly 16. The platform assembly 20 includes a deck 66 and a plurality of surrounding handrails 68. In the illustrated embodiment, the platform assembly 20 is positioned above the tank assembly 16 and proximate the tank partition 60. However, in alternate embodiments, the optional platform assembly 20 can be positioned in other locations sufficient to facilitate visual observation of the operation of the clarifier system 10 within the tank assembly 16. It should be understood that the platform assembly 20 is optional and the operation of the clarifier system 10 can be practiced without the platform assembly.

Referring now to FIGS. 1-3, the discharge pipe system 22 is connected to the tank assembly 16 and is configured to convey settleable solids that have settled in a lower portion of the tank assembly 16 to downstream facilities (not shown). The discharge pipe system 22 includes a plurality of outlet fittings 70, each fluidly connected to a solids outlet conduit 72. Each of the outlet fittings 70 is selectively operable, in a manner such that the settleable solids received from the various plurality of separator cartridge assemblies 14a-14f can be discharged from the discharge pipe system 22 through a selected outlet fitting 70, independent of the operation of the other outlet fittings 70. The solids outlet conduit 72 includes a solids outlet port 74 configured to convey the settleable solids to downstream operations.

Figure 6:
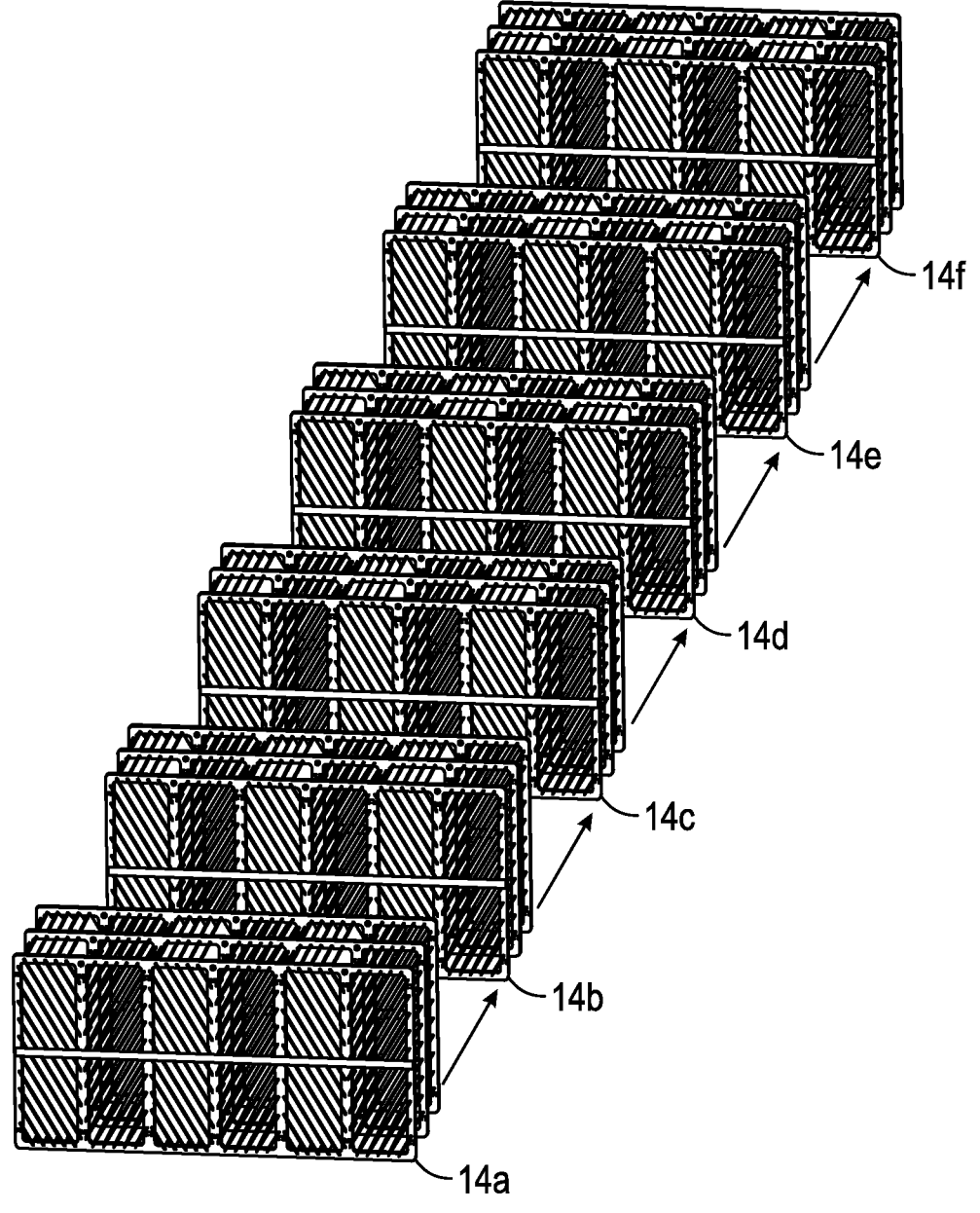
FIG. 6 is a right-side, exploded perspective view of a plurality of separator cartridge assemblies of the novel mobile clarifier system of FIG. 1.

Referring now to FIGS. 1, 3 and 6, each of the plurality of separator cartridge assemblies 14a-14f abut an adjacent separator cartridge assembly. Oriented in this manner and in operation, the flow of water and/or processing fluids passes through all of the separator cartridge assemblies 14a-14f. While the embodiment of the clarifier system shown in FIGS. 1, 3 and 6 illustrates a quantity of six (6) separator cartridge assemblies, it should be appreciated that in other embodiments more or less than a quantity of six (6) separator cartridge assemblies can be used.

Figure 7:
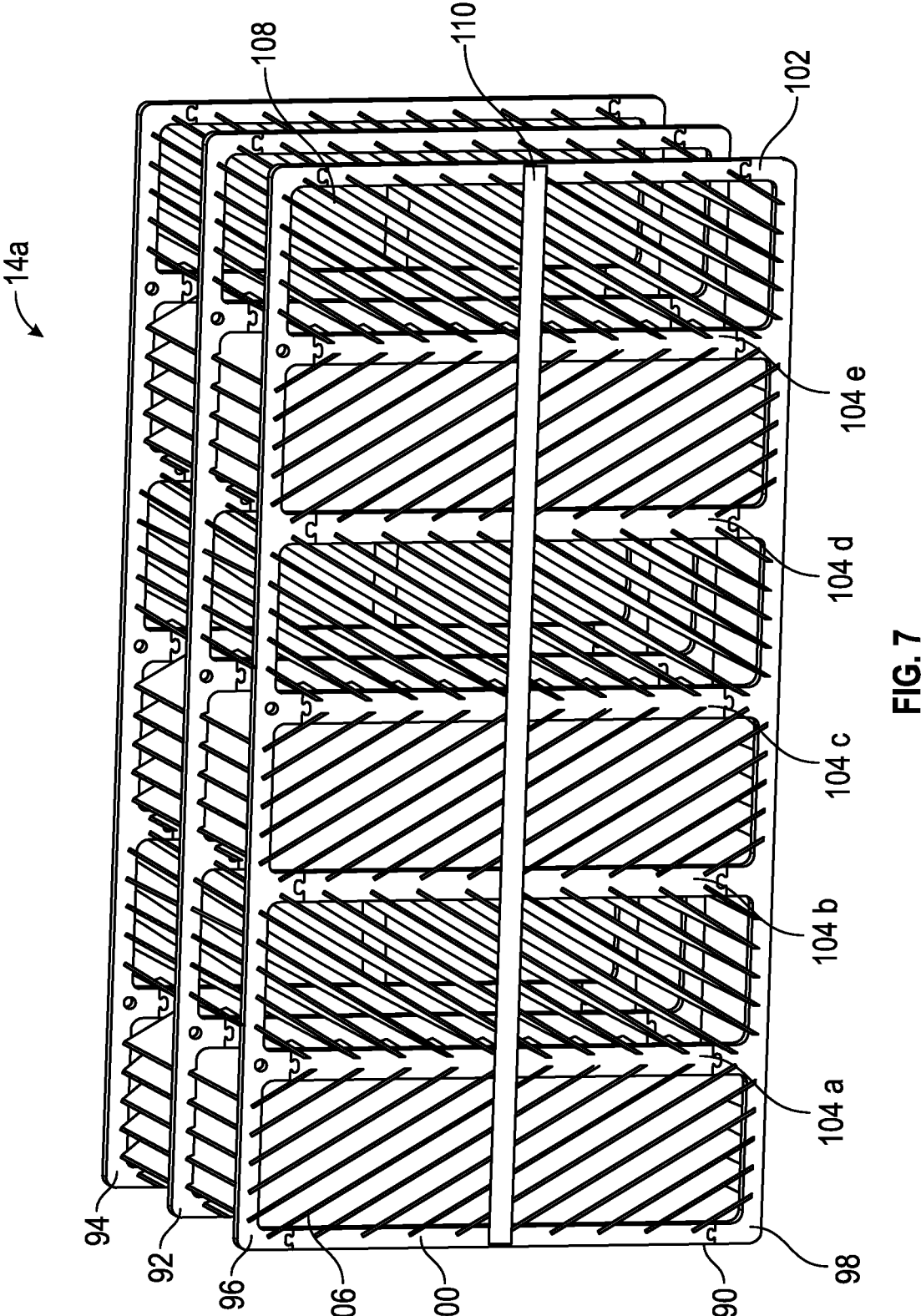
FIG. 7 is a front perspective view of a separator cartridge assemblies of the plurality of separator cartridge assemblies of FIG. 6.

Referring now to FIG. 7, the separator cartridge assembly 14a is illustrated. The separator cartridge assembly 14a is representative of the separator cartridge assemblies 14b-14f. Generally, as the flow of water and/or processing fluids flow through the separator cartridge assembly 14a, different zones are created, including a plurality of flow zones, a plurality of transition zones and a plurality of calm zones. In certain instances, the flow zones are arranged to facilitate the settling of settleable solids from the water and/or processing fluids. In other instances, the flow zones are arranged to facilitate separation of the floating solids/oils from the water and/or processing fluids.

Referring now to FIG. 7, the separator cartridge assembly 14a includes a first framework 90 (FIG. 7), a second framework 92 and a third framework 94. Each of the frameworks 90, 92, 94 includes an upper frame 96, an opposing lower frame 98, a first side frame 100, an opposing second side frame 102, a plurality of spaced apart intermediate frames 104a-104e, a plurality of first angled vanes 106, a plurality of second angled vanes 108 and a stabilizer 110. As shown in FIG. 7, the upper frame 96 of the first, second and third frameworks 90, 92, 94 align with each other. In a similar manner, the lower frame 98, first side frame 100, second side frame 102 and the intermediate frames 104a-104e of the first, second and third frameworks 90, 92, 94 align with each other.

Figure 8:
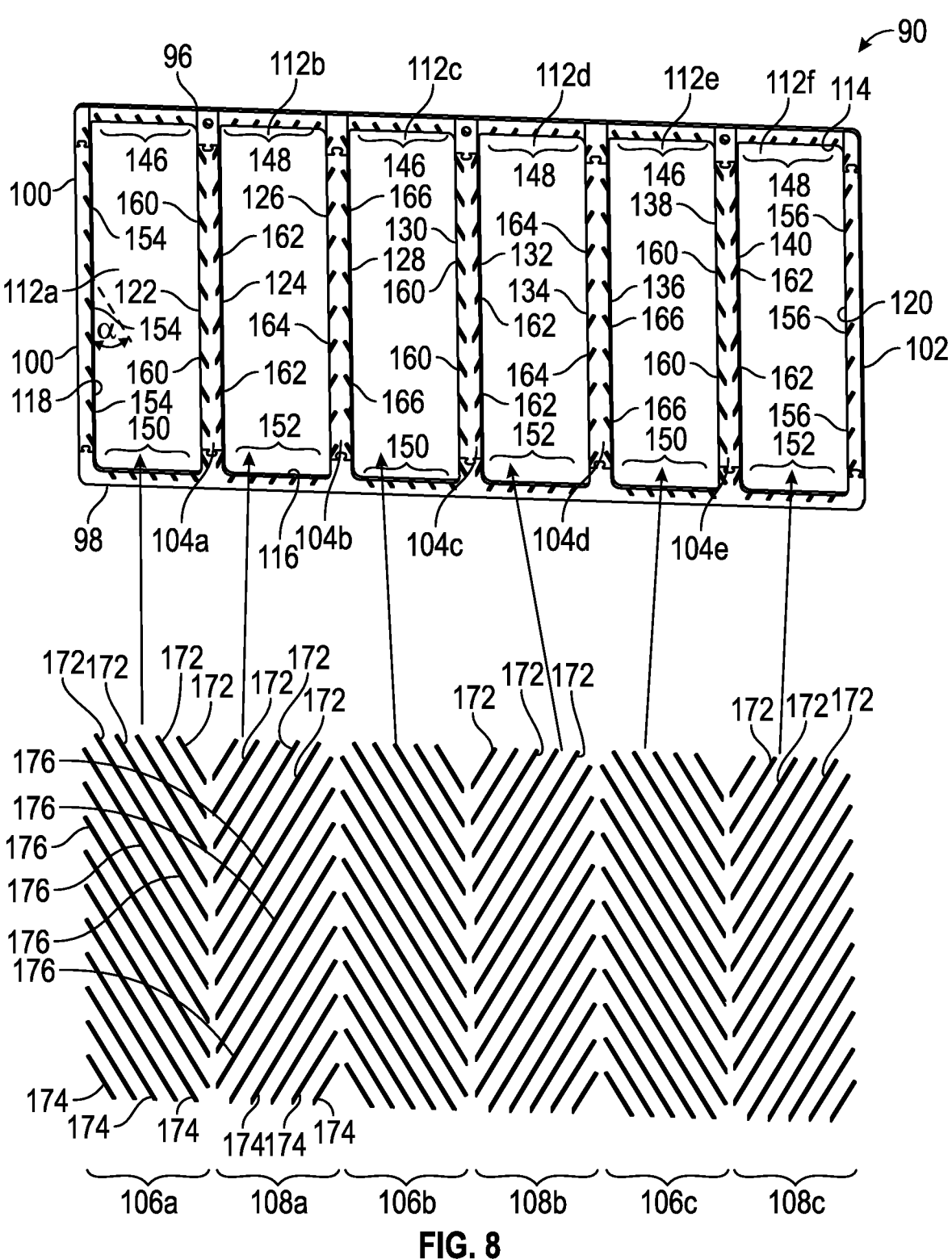
FIG. 8 is a front, exploded view of a first framework of the separator cartridge assemblies of FIG. 6.

Referring now to FIG. 8, the first framework 90 is illustrated. The first framework 90 is representative of the second and third frameworks 92, 94. A first opening 112a is defined by a portion of the upper frame 96, a portion of the lower frame 98, the first side frame 100 and the intermediate frame 104a. A second opening 112b is defined by a portion of the upper frame 96, a portion of the lower frame 98, the intermediate frame 104a and the intermediate frame 104b and a third opening 112c is defined by a portion of the upper frame 96, a portion of the lower frame 98, the intermediate frame 104b and the intermediate frame 104c. In a similar manner, a fourth opening 112d is defined by a portion of the upper frame 96, a portion of the lower frame 98, the intermediate frame 104c and the intermediate frame 104d, a fifth opening 112e is defined by a portion of the upper frame 96, a portion of the lower frame 98, the intermediate frame 104d and the intermediate frame 104e and a sixth opening 112f is defined by a portion of the upper frame 96, a portion of the lower frame 98, the intermediate frame 104e and the second side frame 102.

Referring again to FIG. 8, the upper frame 96 includes an interior edge 114 and the lower frame 98 includes an interior edge 116. The first side frame 100 includes an interior edge 118 and the second side frame 102 includes an interior edge 120. The intermediate frame 104a includes a first interior edge 122 and a second interior edge 124. In a similar manner, the intermediate frame 104b includes a first interior edge 126 and a second interior edge 128, the intermediate frame 104c includes a first interior edge 130 and a second interior edge 132, the intermediate frame 104d includes a first interior edge 134 and a second interior edge 136 and the intermediate frame 104e includes a first interior edge 138 and a second interior edge 140.

Referring again to FIG. 8, the upper frame 96 includes an alternating pattern of a first plurality of spaced apart slots 146 extending in a first angled direction into the upper frame 96 and a second plurality of spaced apart slots 148 extending in a second angled direction into the upper frame 96. Similarly, the lower frame 98 includes an alternating pattern of a first plurality of spaced apart slots 150 extending in a first angled direction into the lower frame 98 and a second plurality of spaced apart slots 152 extending in a second angled direction into the lower frame 98. The first side frame 100 includes a first plurality of spaced apart slots 154 extending in a first angled direction into the first side frame 100 and the second side frame 102 includes a second plurality of spaced apart slots 156 extending in a second angled direction into the second side frame 102.

Referring again to FIG. 8, each of the intermediate frames 104a, 104c and 104e includes a first plurality of spaced apart slots 160 extending in a first angled direction into the intermediate frames 104a, 104c and 104e from the interior edges 122, 130 and 138 and a second plurality of spaced apart slots 162 extending in a second angled direction into the intermediate frames 104a, 104c and 104e from the interior edges 124, 132 and 140. The slots 160 are coplaner with the first plurality of slots 146, 150 and the slots 162 are coplanar with the second plurality of slots 148, 152.

Referring again to FIG. 8, each of the intermediate frames 104b and 104d includes a first plurality of spaced apart slots 164 extending in a first angled direction into the intermediate frames 104b and 104d from the interior edges 126 and 134 and a second plurality of spaced apart slots 166 extending in a second angled direction into the intermediate frames 104b and 104d from the interior edges 128 and 136. The slots 164 are coplanar with the second plurality of slots 148, 152 and the slots 166 are coplanar with the first plurality of slots 146, 150.

Referring now to FIGS. 7 and 8, the plurality of angled vanes 106a-106c are illustrated. Each of the vanes 106a-106c includes an upper end 172, an opposing lower 174, and an intermediate section 176 extending therebetween. The upper ends 172 of a portion of each of the vanes 106a-106c are installed in the first plurality of slots 146. The vanes 106a-106c then extend to a corresponding slot 160 positioned in the first edges 122, 130 and 138 of the intermediate frames 104a, 104c and 104e. Another portion of the vanes 106a-106c are installed in the first plurality of slots 154 extending from the interior edge 118 of the first side frame 100. The vanes 106a-106c then extend to corresponding slots 160 positioned in the first edges 122, 130 and 138 of the intermediate frames 104a, 104c and 104e or to corresponding slots 150 extending from the interior edge 116 of the lower frame 98.

Referring again to FIGS. 7 and 8, a plurality of angled vanes 108a-108c are illustrated. Each of the vanes 108a-108c includes an upper end 172, an opposing lower 174, and an intermediate section 176 extending therebetween. The upper ends 172 of a portion of each of the vanes 108a-108c are installed in the first plurality of slots 148. The vanes 108a-108c then extend to a corresponding slot 162 positioned in the second edges 124, 132 and 140 of the intermediate frames 104a, 104c and 104e. Another portion of the vanes 108a-108c are installed in the first plurality of slots 164 extending from the interior edge 126 of the intermediate frames 104b and 104d. The vanes 108a-108c then extend to corresponding slots 162 positioned in the second edges 124, 132 and 140 of the intermediate frames 104a, 104c and 104e or to corresponding slots 152 extending from the interior edge 116 of the lower frame 98.

Referring now to FIG. 8, each of the slots 154, 156, 160, 162, 164 and 166 is inclined relative to the interior edge 118 of the first side frame 100 and forms an angle α with the interior edge 118 of the first side frame 100. As will be discussed in more detail below, the angle α is configured to position the first and second vanes 106a-106c and 108a-108c at an angle within the first, second and third frameworks 90, 92 and 94, with the inclined first and second vanes 106a-106c and 108a-108c configured to convey settleable solids in a certain direction and floatable substances in a different direction. In the illustrated embodiment, the angle α is in a range of from about 25° to about 35°. In alternate embodiments, the angle α can be less than about 25° or more than about 35°, sufficient to convey settleable solids in a certain direction and floatable substances in a different direction.

Referring again to FIG. 8, the first vanes 106a-106c of every other row are inclined in one direction while the second vanes 108a-108c of every intervening row are inclined in the opposite direction. Accordingly, the first vanes 106a slope in a downward direction progressing away from the first side frame 100 to the intermediate frame 104a, the first vanes 106b slope in a downward direction progressing from the intermediate frame 104b to the intermediate frame 104c and the first vanes 106c slope in a downward direction progressing from the intermediate frame 104d to the intermediate frame 104e.

Referring again to FIG. 8, the second vanes 108a slope in an upward direction progressing away from the intermediate frame 104a to the intermediate frame 104b, the second vanes 108b slope in an upward direction progressing from the intermediate frame 104c to the intermediate frame 104d and the second vanes 108c slope in an upward direction progressing from the intermediate frame 104e to the second side frame 102.

Referring again to FIG. 7, the second and third frameworks 92, 94 are aligned with the first framework 90 in a manner such as to receive the portions of the first and second angled vanes 106a-106c and 108a-108c extending beyond the first framework 90.

Figure 9:
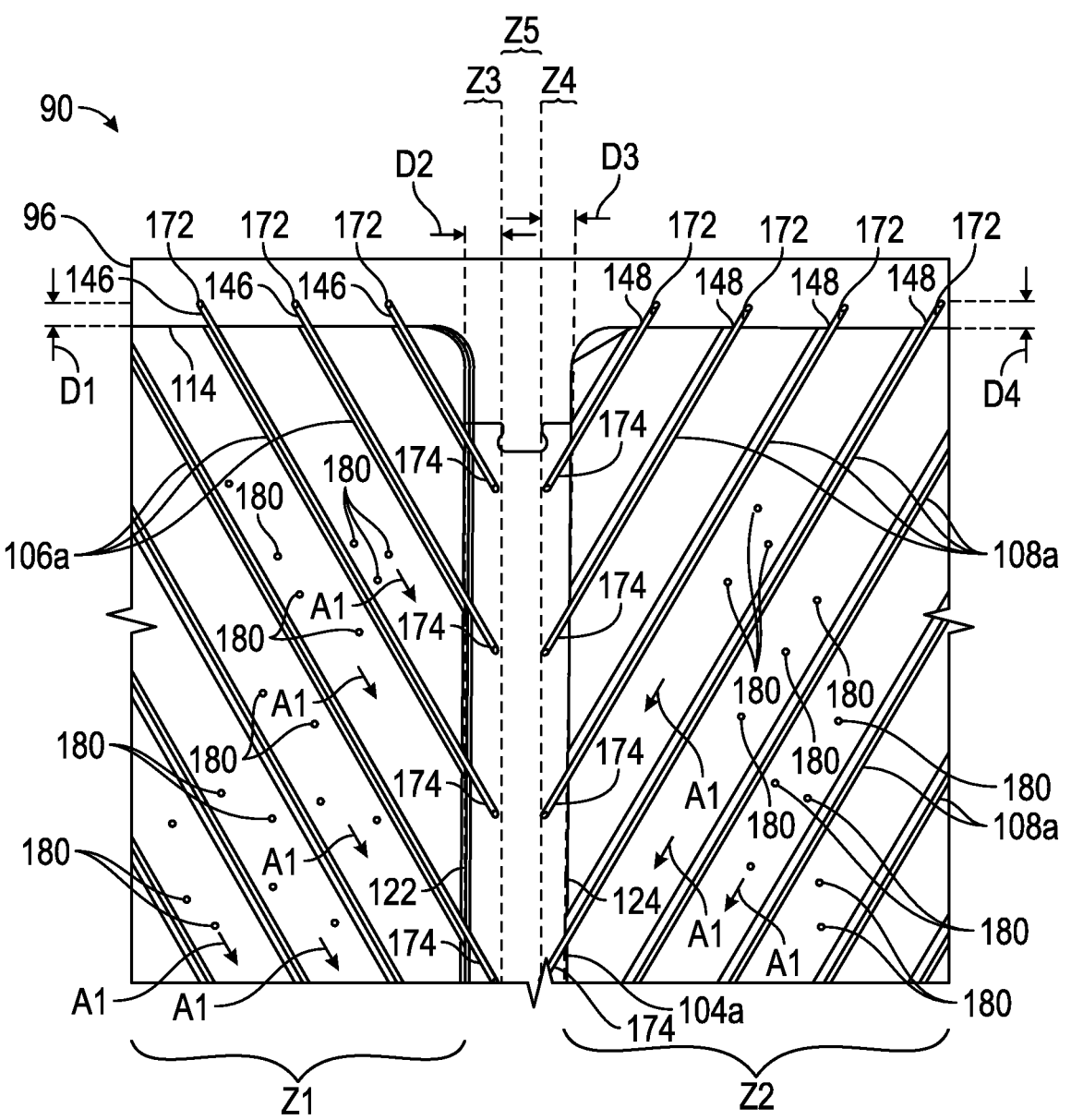
FIG. 9 is a front view of a portion of the first framework of the separator cartridge assembly of FIG. 7.

Referring now to FIG. 9, an enlarged portion of the first framework 90 is illustrated, showing both a portion of the upper frame 96 and a portion of the intermediate frame 104a. The upper ends 172 of the first angled vanes 106a are shown extending in an inward direction past the interior edge 114 of the upper frame 96 and into the first plurality of slots 146 a distance D1. In a similar manner, the lower ends 174 of the first angled vanes 106a are shown extending in an inward direction past the first interior edge 122 of the intermediate frame 104a and into the first plurality of slots 160 a distance D2.

Referring again to FIG. 9, the upper ends 172 of the second angled vanes 108a are shown extending in an inward direction past the interior edge 114 of the upper frame 96 and into the second plurality of slots 148 a distance D3. In a similar manner, the lower ends 174 of the second angled vanes 108a are shown extending in an inward direction past the second interior edge 124 of the intermediate frame 104a and into the second plurality of slots 162 a distance D4.

Referring again to FIGS. 8 and 9, a first flow zone Z1 is formed between the first interior edge 122 of the intermediate frame 104a, the interior edge 114 of the upper frame 96, the interior edge 118 of the first side frame 100 and the interior edge 116 of the lower frame 98. In a similar manner, a second flow zone Z2 is formed between the second interior edge 124 of the intermediate frame 104a, the interior edge 114 of the upper frame 96, the first interior edge 126 of the intermediate frame 104b and the interior edge 116 of the lower frame 98.

Referring again to FIGS. 8 and 9, a first transition zone Z3 is formed between the first interior edge 122 of the intermediate frame 104a and the lower ends 174 of the first angled vanes 106a. In a similar manner, a second transition zone Z4 is formed between the second interior edge 124 of the intermediate frame 104a and the lower ends 174 of the second angled vanes 108a. In the illustrated embodiment, the first and second transition zones Z3, Z4 have a substantially vertical and planar orientation. However, in other embodiments, the first and second transition zones Z3, Z4 can have other desired orientations. A first calm zone Z5 is formed between the first and second transition zones Z3, Z4. The zones Z1-Z5 will be discussed in more detail below.

Figure 10:
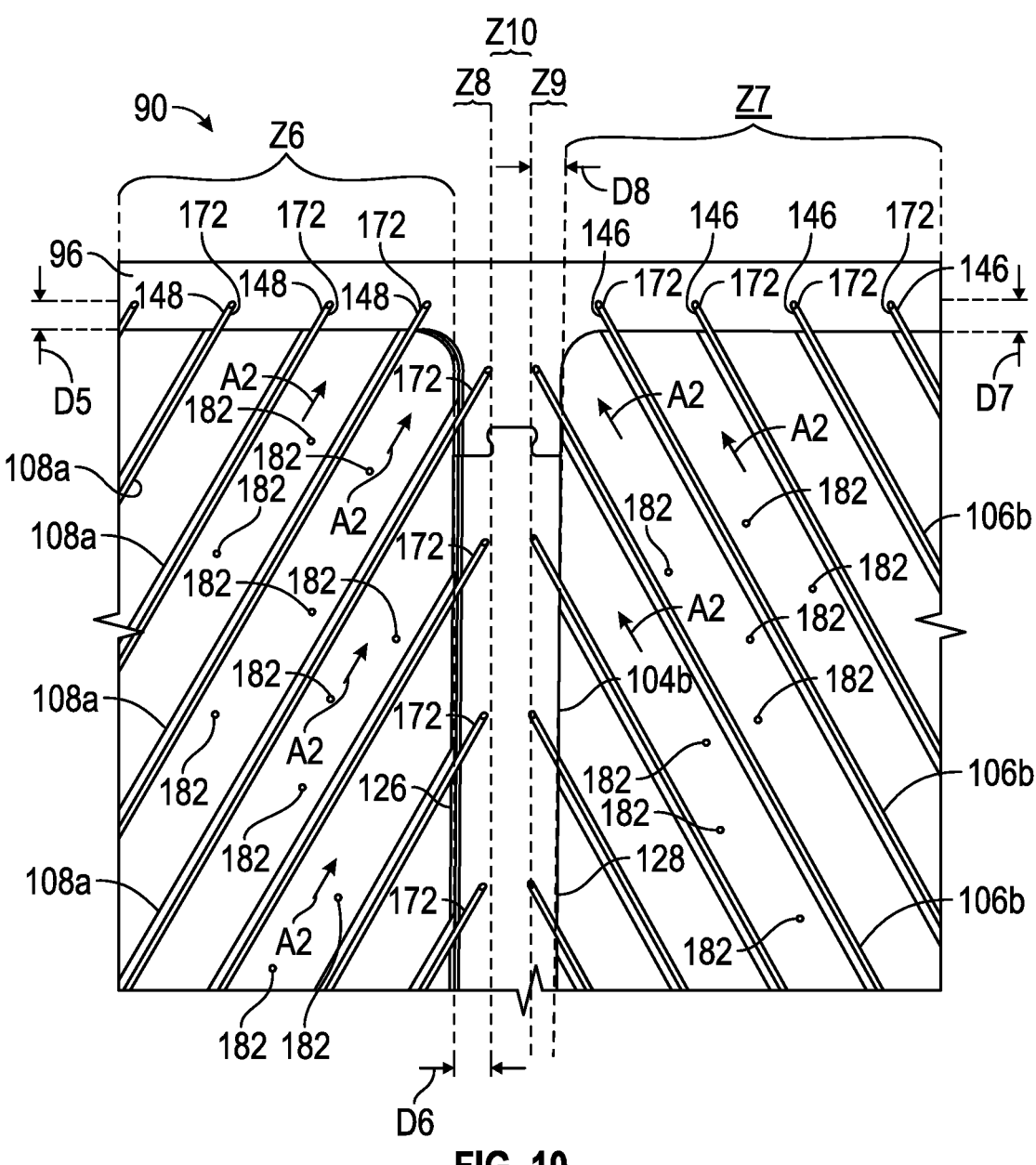
FIG. 10 is a front view of a second portion of the first framework of the separator cartridge assembly of FIG. 7.

Referring now to FIG. 10, an enlarged portion of the first framework 90 is illustrated, showing both a portion of the upper frame 96 and a portion of the intermediate frame 104b. The upper ends 172 of the first angled vanes 108a are shown extending in an inward direction past the interior edge 114 of the upper frame 96 and into the second plurality of slots 148 a distance D5. In a similar manner, the upper ends 172 of the second angled vanes 108a are shown extending in an upward direction past the first interior edge 126 of the intermediate frame 104b and into the first plurality of slots 164 a distance D6.

Referring again to FIG. 10, the upper ends 172 of the first angled vanes 106a are shown extending in an inward direction past the interior edge 114 of the upper frame 96 and into the first plurality of slots 146 a distance D7. In a similar manner, the upper ends 172 of the first angled vanes 106a are shown extending in an inward direction past the second interior edge 128 of the intermediate frame 104b and into the second plurality of slots 166 a distance D8.

Referring now to FIGS. 8 and 10, a third flow zone Z6 is formed between the first interior edge 126 of the intermediate frame 104b, the interior edge 114 of the upper frame 96, the second interior edge 124 of the intermediate frame 104a and the interior edge 116 of the lower frame 98. In a similar manner, a fourth flow zone Z7 is formed between the second interior edge 128 of the intermediate frame 104b, the interior edge 114 of the upper frame 96, the first interior edge 130 of the intermediate frame 104c and the interior edge 116 of the lower frame 98.

Referring again to FIGS. 8 and 10, a third transition zone Z8 is formed between the first interior edge 126 of the intermediate frame 104b and the upper ends 172 of the second angled vanes 108a. In a similar manner, a fourth transition zone Z9 is formed between the second interior edge 128 of the intermediate frame 10ba and the upper ends 172 of the first angled vanes 106a. In the illustrated embodiment, the third and fourth transition zones Z8, Z9 have a substantially vertical and planar orientation. However, in other embodiments, the third and fourth transition zones Z8, Z9 can have other desired orientations. A second calm zone Z10 is formed between the third and fourth transition zones Z8, Z9. The zones Z1-Z10 will be discussed in more detail below.

Referring now to FIGS. 9 and 10, the distances D1-D8 provide numerous benefits, although all benefits may not be available in all embodiments. First, the assembly formed by the insertion of the vanes 106a-106c and 108a-108c into the distances D1-D8 formed by the slots provide structural integrity to the aligned first, second and third frameworks 90, 92 and 94. Second, the structural integrity provided by the assembled vanes into the slots having distances D1-D8 facilitate the use of lightweight materials, such as a non-limiting example of polymeric materials or combinations or polymeric materials, for the first and second plurality of angled vanes 106a-106c and 108a-108c, the first, second and third frameworks 90, 92, 94 and the intermediate frames 104a-104e. The use of lightweight materials facilitates the movement and transportability of the mobile clarifier system 10. In certain instances, the use of lightweight materials advantageously allows the trailer assembly 12 to have a single axle configuration. Third and as will be discussed in more detail below, the insertion of the vanes into the slots enables the vanes 106a-106c and 108a-108c to advantageously guide settleable solids and floatable solids through transition zones and into calm zones.

Referring again to the embodiment shown in FIGS. 9 and 10, the distances D1-D8 are in a range of from about 0.50 inches to about 0.75 inches. However, in other embodiments, the distances D1-D8 can be less than about 0.50 inches or more than about 0.75 inches, sufficient for the functions described herein. While the embodiment shown in FIGS. 9 and 10 illustrates each of the distances D1-D8 as being the same, it is contemplated that in other embodiments, the distances D1-D8 can be different from each other.

Referring now to FIGS. 1 and 9, as water and/or processing fluids flow from the outlet end 64 of the inlet port 18 into the tank assembly 16, the flow is metered by the diffusion wall 58 in a manner such that the water and/or processing fluids are divided into separate laminar flows entering the first separator cartridge assembly 14a. Each of the laminar flows is bounded within the areas between the upper frame 96, lower frame 98, first side frame 100, second side frame 102 and the intermediate frames 104a-104e. As the laminar flows proceed within these areas, the laminar flows flow over the first and second angled vanes 106a-106c and 108a-108c.

Referring now to FIG. 9, in operation the first and second flow zones Z1, Z2 receive the laminar flows from the diffusion wall 58 and convey the laminar flows over the first and second angled vanes 106a-106c and 108a-108c from the first framework 90 to the third framework 94. As the laminar flows flow over the first and second angled vanes 106a-106c and 108a-108c, the inclination of the first and second angled vanes 106a-106c and 108a-108c is configured to permit movement of the settleable solids 180 in a direction toward the intermediate frame 104a, as depicted by first direction arrow A1.

Referring again to FIG. 9, as the settleable solids 180 move in a direction toward the intermediate frame 104a, the settleable solids 180 encounter the first and second transition zones Z3, Z4. The first and second transition zones Z3, Z4 are formed between the first and second flow zones Z1, Z2 and the first calm zone Z5 and are characterized by the interaction of the laminar flows of the water and/or processing fluids in the first and second flow zones Z1, Z2 and the relatively still nature of the water and/or processing fluids in the first calm zone Z5. Without being held to the theory, it is believed the first and second transition zones Z3, Z4 form buffers between the first and second flow zones Z1, Z2 and the first calm zone Z5, thereby facilitating the movement of the settleable solids 180 from first and second flow zones Z1, Z2 into the first calm zone Z5.

Referring again to FIG. 9, as the lower ends 174 of the first and second angled vanes 106a-106c and 108a-108c define interior edges of the first and second transition zones Z3, Z4, the settleable solids 180 are guided by the first and second angled vanes 106a-106c and 108a-108c through the first and second transition zones Z3, Z4 and into the first calm zone Z5. Advantageously, in this manner the settleable solids 180 are guided past the first and second interior edges of 122, 124 of the intermediate frame 104a, thereby minimizing the influence of the intermediate frame 104a on the flow of the laminar flows of the water and/or processing fluids in the first and second flow zones Z1, Z2.

Referring now to FIG. 10, in operation the first and second flow zones Z6, Z7 receive the laminar flows from the diffusion wall 58 and convey the laminar flows over the first and second angled vanes 106a-106c and 108a-108c from the first framework 90 to the third framework 94. As the laminar flows flow over the first and second angled vanes 106a-106c and 108a-108c, the upward inclination of the first and second angled vanes 106a-106c and 108a-108c is configured to permit movement of the floatable solids 182 in a direction toward the intermediate frame 104b, as depicted by second direction arrow A2.

Referring again to FIG. 10, as the floatable solids 182 move in a direction toward the intermediate frame 104b, the floatable solids 182 encounter the third and fourth transition zones Z8, Z9. The third and fourth transition zones Z8, Z9 are formed between the first and second flow zones Z6, Z7 and the second calm zone Z10 and are characterized by the interaction of the laminar flows of the water and/or processing fluids in the third and fourth flow zones Z6, Z7 and the relatively still nature of the water and/or processing fluids in the second calm zone Z10. Without being held to the theory, it is believed the third and fourth transition zones Z8, Z9 form buffers between the third and fourth flow zones Z6, Z7 and the second calm zone Z10, thereby facilitating the movement of the floatable solids 182 from third and fourth flow zones Z6, Z7 into the second calm zone Z10.

Referring again to FIG. 10, as the upper ends 172 of the first and second angled vanes 106a-106c and 108a-108c define interior edges of the third and fourth transition zones Z8, Z9, the floatable solids 182 are guided by the first and second angled vanes 106a-106c and 108a-108c through the third and fourth transition zones Z8, Z9 and into the second calm zone Z10. Advantageously, in this manner the floatable solids 182 are guided past the first and second interior edges of 126, 128 of the intermediate frame 104b, thereby minimizing the influence of the intermediate frame 104b on the flow of the laminar flows of the water and/or processing fluids in the third and fourth flow zones Z6, Z7.

Referring now to FIGS. 8-10, the moving settleable solids 180 and floatable solids 182 are guided past the transition zones and into the calm zone by the ends of the first and second angled vanes. The calm zones are created as a result of the positioning of the intermediate frames 104a-104e, which are spaced horizontally from each other across the path of the water and/or processing fluids flowing into the first framework 90. The spaced apart intermediate frames 104a-104e define the extreme upstream end of the separator cartridge assembly 14a and serve to laterally deflect the incoming water and/or processing fluids into the spaces between the intermediate frames 104b-104e. The water and/or processing fluids flowing through the spaces consists of substantially laminar and horizontal streams which remain non-turbulent provided the velocity of the water is kept below 6 ft./min. As a result of the laminar flow in the spaces between the intermediate frames 104b-104e and the transition zones, the water and/or processing fluids in the spaces which are aligned directly with and located downstream of the intermediate frames 104b-104e remain substantially calm and free of downstream flow. The calm zones formed downstream of the intermediate frames 104a-104e correspond substantially in width and height to the width and height of the intermediate frames 104a-104e and correspond in length to the length of the separator cartridge assemblies 14a-14f.

Referring again to FIGS. 8-10, the flow of the incoming water and/or processing fluids within the spaces between the intermediate frames 104b-104e is divided into several streams by horizontally spaced rows of the vertically spaced, angled vanes 106a-106c and 108a-108c. In the illustrated embodiment, each of the vertically spaced, angled vanes 106a-106c and 108a-108c has a flat or planar form, is inclined at an angle as described above, is oriented to be parallel with the other vanes and is of uniform width throughout its length. However, it is contemplated that in other embodiments, the vertically spaced, angled vanes 106a-106c and 108a-108c can have other forms, can be inclined at other angles, can be oriented in other arrangements with respect to the vanes and can be of varying widths throughout their lengths.

Referring again to FIGS. 8-10, by virtue of the buffering effect of the transition zones, advantageously the laminar flow of the water and/or processing fluids entering the separator cartridge assembly 14a neither affects nor is affected by the water and/or processing fluids in the calm zones. The floatable and settleable solids react in the laminar streams just as they would in still water and thus the floatable solids start rising in the laminar streams and the settleable solids begin to sink. As the floatable substances rise, they contact the undersides of the overlying vanes and are deflected laterally and upwardly, through the transition zones and into the calm zones. By the same token, the sinking settleable solids contact the upper sides of the underlying vanes and are deflected laterally and downwardly through the transition zones and into the calm zones. Floating and settling of the solids in the laminar streams take place at free and non-hindered settling and rise rates because of unrestricted discharge of the substances through the transition zones and into the calm zones. Once the solids reach the calm zones, they are considered to be separated from the laminar flows and the transition zones and they will float upwardly through the calm zones to a flotation zone 184 (FIG. 1) or sink downwardly through the calm zones to the tank bottom 56 (FIG. 2). The upward floating and downward sinking processes are considered to take place at free settling and rise rates since floating and sinking of the solids is not hindered by compaction of the solids in the calm zones. In certain instances, optionally compaction of the floatable solids or the settleable solids can occur in the floatation zone 184 and/or the tank bottom 56. However, it should be considered that the compaction of the floatable solids or the settleable solids is optional and not required for operation of the mobile clarifier system 10.

Referring again to FIGS. 8-10, as the vertically spaced, angled vanes 106a-106c and 108a-108c of the alternate rows are inclined in opposite directions, the calm zones aligned with certain intermediate frames serve as escape ducts for floatable solids while the calm zones aligned the other intermediate frames serve as escape ducts for settleable solids. As an example and referring now to FIG. 9, the first calm zone Z5, aligned with the intermediate frame 104a receives settleable solids 180 from the vanes 106a on its left and also from the vanes 108a on its right. The first calm zone Z5 does not receive any floatable solids since the floatable solids from the vanes 106a on its left go to the calm zone on its left while the settleable solids from the vanes 108a on its right go to the calm zone on its right. Accordingly, each calm zone receives only the settleable solids from two adjacent rows of vanes or only the floatable solids from two adjacent rows of vanes and no calm zone is subjected to a counterflow of settleable or floatable solids. Further, no laminar stream, transition zone or calm zone is subjected to a counterflow of liquid to liquid or liquid to solids. Moreover, there is no counterflow of settleable solids to floatable solids as the solids are discharged out of the laminar streams across the spaced apart, angled vanes. Advantageously, the complete avoidance of counterflow is achieved without the need of dividing each calm zone with a structure, such as for example a partition.

Referring now to FIGS. 6-10, the intermediate frames 104a-104e and the spaced apart, angled vanes 106a-106c, 108a-108c are contained within a box-like structure formed by first, second and third frameworks 90, 92 and 94 the which serves to interconnect the spaced apart, angled vanes 106a-106c, 108a-108c along their lengths. Referring now to FIG. 7, a stabilizer 110 extends across each of the first, second and third frameworks 90, 92 and 94 in a generally horizontal direction. The stabilizer 110 is configured to provide structural rigidity to each of the first, second and third frameworks 90, 92 and 94. While the embodiment shown in FIG. 7 illustrates a lone stabilizer 110 arranged in a generally centered position of the first framework 90, in other embodiments, any desired quantity of stabilizers can be used and the stabilizers can be arranged in other positions of the first, second and third frameworks 90, 92 and 94.

Referring now to FIGS. 1-5 and 7-9 operation of the mobile clarifier system 10 will now be described. Referring first to FIG. 3, in operation, a flow of water and/or processing fluids enters the inlet port 18 from an up-stream source (not shown) as shown by direction arrow A3. The flow of water and/or processing fluids exits the inlet port 18 and enters a first compartment 76 as shown by direction arrow B. The first compartment 76 is bounded by the first and second side walls 40, 42, the first and second angled side walls 44, 46, the first end wall 48, the tank bottom 56 and the diffusion wall 58. The flow of water and/or processing fluids is metered and calmed by the diffusion wall 58 and exits the diffusion wall 58 as shown by direction arrow C. Next, the flow of water and/or processing fluids enters the plurality of separator cartridge assemblies 14a-14f for remove of settleable solids, as depicted by direction arrow E, as well as separation of the floatable solids from water or processing fluids. The settleable solids are conveyed from the mobile clarifier system 10 by the solids outlet conduit 72. The water and/or processing fluids flow through the plurality of separator cartridge assemblies 14a-14f as shown by direction arrow F. The remaining flow, now having the floatable solids and absent the settleable solids, exits the plurality of separator cartridge assemblies 14a-14f and enters a second compartment 76 bounded on the downstream side by the tank partition 60. The floatable solids in the second compartment 76 are skimmed from the remaining flow.

Figure 11:
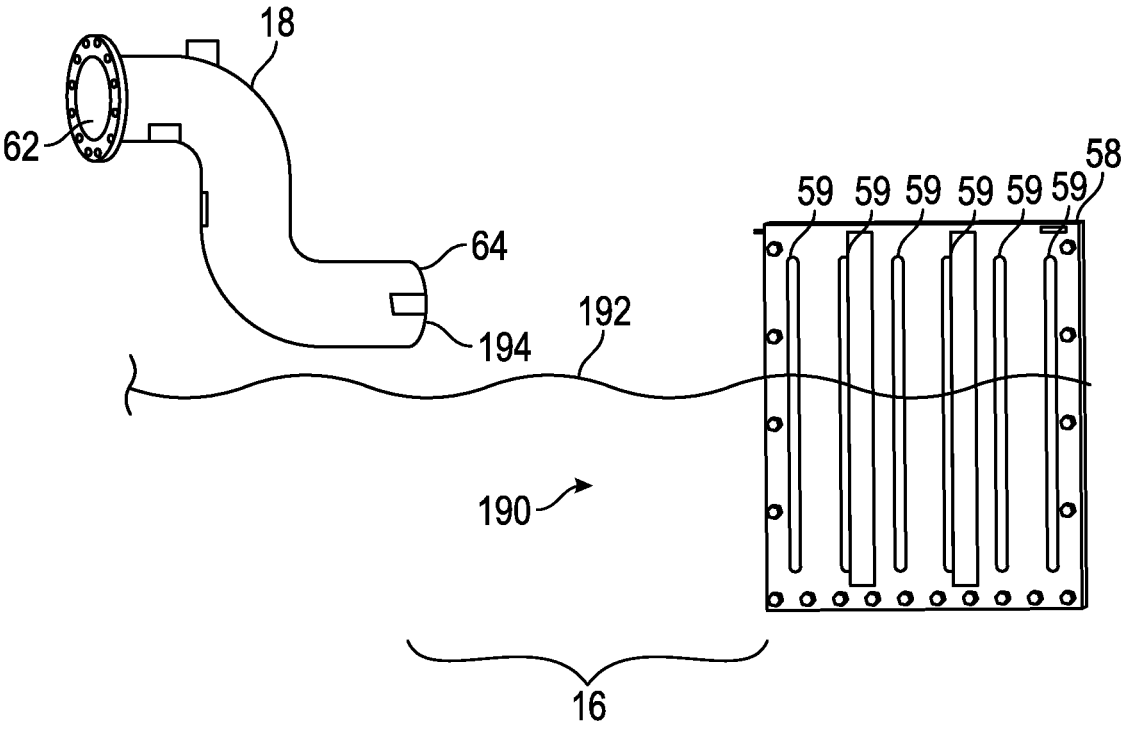
FIG. 11 is a schematic illustration of an inlet port of the novel mobile clarifier system of FIG. 1 in relation to the diffusion wall of FIG. 4.

Referring now to FIG. 11, the relationship of the inlet port 18 to the diffusion wall 58 is illustrated. The inlet port 18 includes the inlet end 62 and the outlet end 64. The diffusion wall 58 having the plurality of apertures 59. As described above, water and/or processing fluids flow from an up-stream source through the inlet port 18 and are retained in the tank assembly 16 by the diffusion wall 58. As the diffusion wall meters the amount of water and/or processing fluids entering the plurality of separator cartridge assemblies and quiets flow of water and/or processing fluids entering the plurality of separator cartridge assemblies, an accumulation 190 of the water and/or processing fluids forms within the tank assembly 16. The accumulation 190 forms an upper level 192. The upper level 192 of the accumulation is positioned below a lower level 194 of the outlet end 64 of the inlet port 18. By orienting the lower level 194 of the outlet end 64 of the inlet port 18 in a vertical position above the upper level 192 of the accumulation 190, advantageously a backflow of the water and/or processing fluids into the inlet port 18 is prevented.

The mobile clarifier system 10 provides many advantages, although all advantages may not be available in all embodiments. First, the extension of the vanes into the elements forming the frameworks and the intermediate frames form transition zones that advantageously form buffers between the flow zones and the calm zones, thereby facilitating the movement of the settleable solids from flow zones into the calm zones. Second, each of the separator cartridge assemblies includes a stabilizer configured to provide structural rigidity to each of the first, second and third frameworks. Third, the outlet end of the inlet port is positioned vertically above an upper level of an accumulation of water and/or processing fluids, thereby preventing a back flow of the water and/or processing fluids into the inlet port. Fourth, the extension of the vanes into the elements forming the frameworks and the intermediate frames provides a structural rigidity to the frameworks, thereby allowing the use of lightweight materials for the angled vanes, the first, second and third frameworks and the intermediate frames, thereby facilitating the movement and transportability of the mobile clarifier system 10.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A mobile clarifier system configured to separate settleable solids and floatable solids from a flow of water and/or processing fluids, the mobile clarifier system comprising:

a trailer assembly;

an inlet port configured to convey the flow of water and/or processing fluids to the trailer assembly, the inlet port including an inlet end and an outlet end;

a plurality of separator cartridge assemblies supported by the trailer assembly and configured to receive the flow of water and/or processing fluids from the inlet port, each of the plurality of separator cartridge assemblies configured to separate the settleable solids and the floatable solids from the flow of water and/or processing fluids, each of the plurality of separator cartridge assemblies including a plurality of frameworks, each framework having an upper frame, a lower frame disposed opposite the upper frame, a first side frame, a second side frame disposed opposite the first side frame, and a plurality of intermediate frames extending from the upper frame to the lower frame and disposed between the first side frame and the second side frame, the plurality of frameworks including a plurality of vanes, each vane of the plurality of vanes extending from one of the first side frames and the second side frames to one intermediate frame of the plurality of intermediate frames and from one intermediate frame of the plurality of intermediate frames to another intermediate frame of the plurality of intermediate frames, each vane of the plurality of vanes extending a distance into each respective intermediate frame, whereby the plurality of intermediate frames and the plurality of vanes cooperate to form a flow zone, a transition zone, and a calm zone for the water and/or processing fluids flowing through each of the plurality of separator cartridge assemblies;

a discharge pipe system configured to receive settleable solids from the calm zone and further configured to convey the settleable solids from the mobile clarifier system to downstream operations; and an outlet port configured to receive processed water and/or processing fluids flowing from the plurality of separator cartridge assemblies and further configured to convey the processed water and/or processing fluids to downstream operation, the outlet port positioned vertically below the outlet end of the inlet port, wherein the inlet port is disposed vertically above the plurality of separator cartridge assemblies and the inlet end of the inlet port is positioned vertically above the outlet end of the inlet port relative to the plurality of separator cartridge assemblies to militate against backflow of water out of the system.

2. The mobile clarifier system of claim 1, wherein the transition zone is positioned between the flow zone and the calm zone.

3. The mobile clarifier system of claim 2, wherein the transition zone forms a buffer between a laminar flow in the flow zone and the calm zone.

4. The mobile clarifier system of claim 1, wherein each of the separator cartridge assemblies includes a stabilizer extending across a framework in a horizontal direction.

5. The mobile clarifier system of claim 1, wherein each vane of the plurality of vanes is inclined at an angle in a range of from 25° to 35° relative to an interior edge of one of the first side frame and the second side frame.

6. The mobile clarifier system of claim 1, wherein each vane of the plurality of vanes extends into each respective intermediate frame a distance in a range of about 0.50 inches to about 0.75 inches.

7. The mobile clarifier system of claim 1, wherein each vane of the plurality of vanes forms an angle of about 30° with a vertical edge of one of the first side frame, the second side frame, and the plurality of intermediate frames.

8. The mobile clarifier system of claim 1, wherein an upper end of a first plurality of vanes within each framework has an upward orientation and a second plurality of vanes within each framework has a downward orientation opposite the first plurality of vanes, whereby the first plurality of vanes is configured to separate settleable solids and the second plurality of vanes is configured to separate floatable solids.

9. The mobile clarifier system of claim 1, wherein the flow of water and/or processing fluids into the trailer assembly forms an accumulation having an upper level, and wherein the outlet end of the inlet port is positioned vertically above the upper level of the accumulation.

10. The mobile clarifier system of claim 1, wherein each of the plurality of separator cartridge assemblies includes a first framework, a second framework, and a third framework aligned with each other such that the upper frames, the lower frames, the first side frames, the second side frames, and the intermediate frames of each framework align with each other.

11. The mobile clarifier system of claim 10, wherein the plurality of vanes extend across the first framework, the second framework, and the third framework.

12. The mobile clarifier system of claim 1, wherein each framework includes a plurality of openings, each opening defined by a portion of the upper frame, a portion of the lower frame, and two adjacent frames selected from the first side frame, the second side frame, and the plurality of intermediate frames.

13. The mobile clarifier system of claim 1, wherein the upper frame and the lower frame each include an alternating pattern of first slots extending in a first angled direction and second slots extending in a second angled direction opposite the first angled direction, wherein the first side frame includes first slots extending in the first angled direction, and wherein the second side frame includes second slots extending in the second angled direction.

14. The mobile clarifier system of claim 1, wherein the mobile clarifier system is configured such that a velocity of the water and/or processing fluids flowing through the plurality of separator cartridge assemblies is maintained below about 6 feet per minute to preserve laminar flow conditions within the flow zones.

15. The mobile clarifier system of claim 1, further comprising a tank assembly supported by the trailer assembly, the tank assembly including a first side wall, an opposing second side wall, a first end wall, an opposing second end wall, a tank bottom, a diffusion wall disposed upstream of the plurality of separator cartridge assemblies, and a tank partition disposed downstream of the plurality of separator cartridge assemblies.

16. The mobile clarifier system of claim 15, wherein the tank partition includes a cutout configured to facilitate flow of the water and/or processing fluids over the tank partition to the outlet port, and wherein the tank partition is configured to form a pool of water and/or processing fluids downstream of the plurality of separator cartridge assemblies to facilitate a skimming operation.

17. The mobile clarifier system of claim 15, wherein the diffusion wall includes a plurality of apertures configured to meter the flow of water and/or processing fluids into the plurality of separator cartridge assemblies and to quiet the flow of water and/or processing fluids entering the plurality of separator cartridge assemblies such that the flow has the characteristics of a laminar flow prior to entering the plurality of separator cartridge assemblies.

18. The mobile clarifier system of claim 1, wherein the plurality of vanes and the plurality of frameworks is formed from a polymer.

19. The mobile clarifier system of claim 1, wherein the trailer assembly includes a tongue segment having a coupler configured for engagement by a winch truck, a wheel segment including at least one wheel assembly supported by at least one axle, and a bed segment extending from the tongue segment to the wheel segment and configured to support the plurality of separator cartridge assemblies.

20. The mobile clarifier system of claim 1, wherein the discharge pipe system includes a plurality of outlet fittings each fluidly connected to a solids outlet conduit, each outlet fitting being independently and selectively operable to discharge settleable solids received from a respective separator cartridge assembly of the plurality of separator cartridge assemblies independent of operation of the remaining outlet fittings.

* * * * *